May 31, 1955   C. E. STRONG   2,709,807
RADIO NAVIGATION
Filed Aug. 25, 1953   2 Sheets-Sheet 1

Inventor
C. E. STRONG
By
Attorney

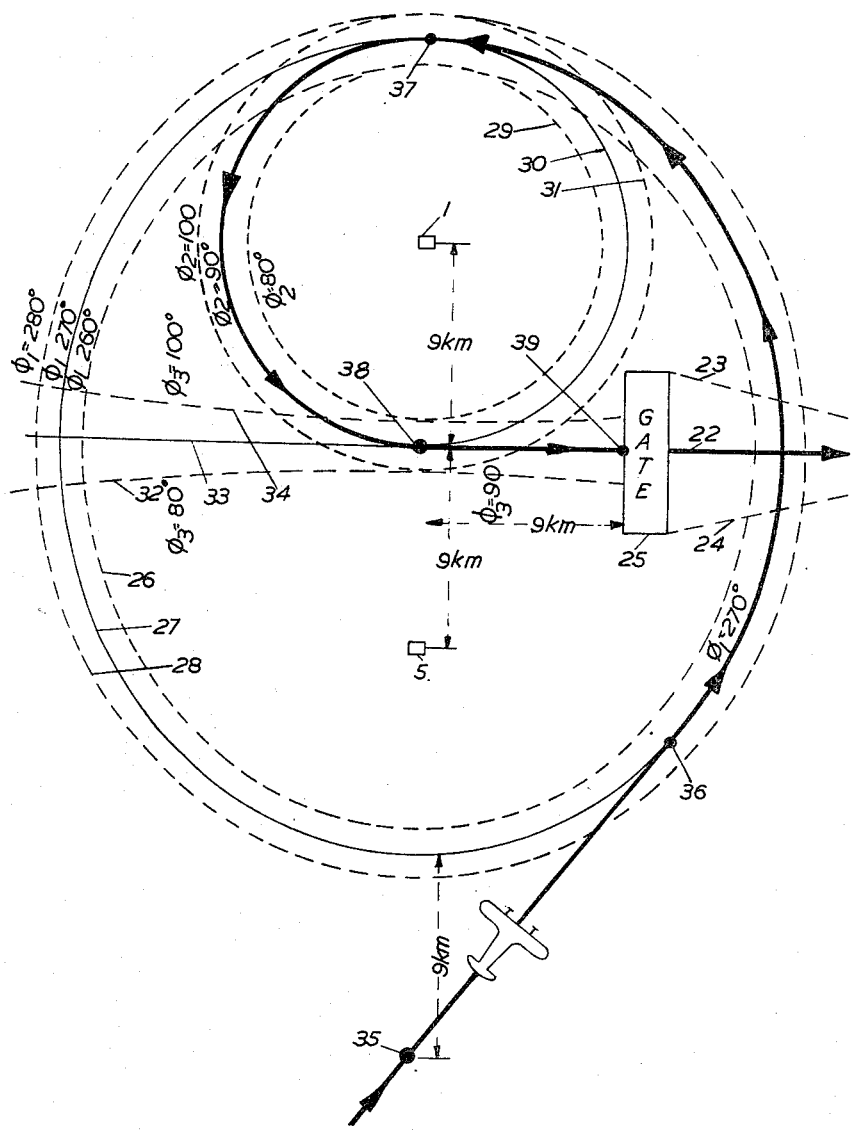

United States Patent Office 2,709,807
Patented May 31, 1955

---

2,709,807

RADIO NAVIGATION

Charles Eric Strong, London, England, assignor to International Standard Electric Corporation, New York, N. Y., a corporation of Delaware Application August 25, 1953, Serial No. 376,460

Claims priority, application Great Britain September 2, 1952

7 Claims. (Cl. 343—107)

This invention relates to radio navigation systems. More particularly, it relates to a system for guiding an aircraft along an approximately spiral course such as may be required when nearing an airport, for guiding the aircraft into the approach zone.

By "approach zone" is to be understood, throughout the present specification and the appended claims, a region within which a landing aircraft is guided down to the runway, for example, by the aid of signals from an instrument landing beacon system of the well-known equi-signal type (I. L. S.), or by the aid of instructions signalled to the pilot from the airport control office, these instructions being based on continuous observation of the aircraft's position by radar means located on the ground (G. C. A.). Such an approach zone is roughly funnel-shaped, being narrow in the neighbourhood of the touchdown point, and expanding over its length of say 10 km. to an entrance or "gate" having horizontal width of 5 km. or even more. It is obviously desirable that in order to facilitate the landing operation the aircraft should preferably be flown into the entrance of the approach zone with the line of flight of the craft aligned with the longitudinal axis of the approach zone.

It is the principal object of the present invention to provide means enabling an aircraft, which arrives from some direction other than that leading straight into the approach zone, to follow approximately a spiral course whereby its direction of flight is changed smoothly until the craft is finally directed straight into the gate of the approach zone.

In order to achieve this object, there is provided, according to the most general aspect of the present invention, a radio navigation system for guiding an aircraft along an approximately spiral course successive parts of which are respectively defined by elliptical, circular and hyperbolic arcs, said system comprising a first radio repeater ground station arranged to repeat timing wave signals transmitted by said aircraft, a second radio repeater ground station spaced from and arranged to repeat the timing wave signal output from said first station, and on said aircraft means for separately receiving the outputs from said two stations and for recovering therefrom the repeated timing wave signals, with means responsive to the timing of said transmitted and said recovered timing wave signals for obtaining indications of the position of said aircraft relative to respective ones of said arcs. It will be understood that in this context the word "arc" is used in its most general sense as simply signifying part of a single curve, which curve may in certain limiting cases approximate to a straight line.

In such an arrangement the timing wave signals may take the form of either a train of pulses, or a train of continuous waves; in the latter case the timing of the signals is conveniently expressed in terms of their phases, and the required indications are obtainable in response to measurements of the phase difference between appropriate ones of the transmitted and recovered timing wave signals taken in pairs. In accordance with well-known technique, the timing wave signal is transmitted as a modulation of a radiated carrier wave whose frequency may be any convenient value within that band of the frequency spectrum which is normally used for guide course signals. By using different values of carrier frequency for transmission from the aircraft, and for the outputs of each of the two repeater stations, the outputs of the two repeater stations may be separately received in the aircraft without difficulty.

The nature of the invention will be more fully understood from the following description of a single embodiment, read in conjunction with the following drawings, in which:

Fig. 2 illustrates the position of the ground equipment included in Fig. 1 with reference to the gate or entrance of an airport approach zone, and also indicates various ellipses, circles and hyperbolae from arcs of which the approximately spiral guide course is built up.

Figure 1:
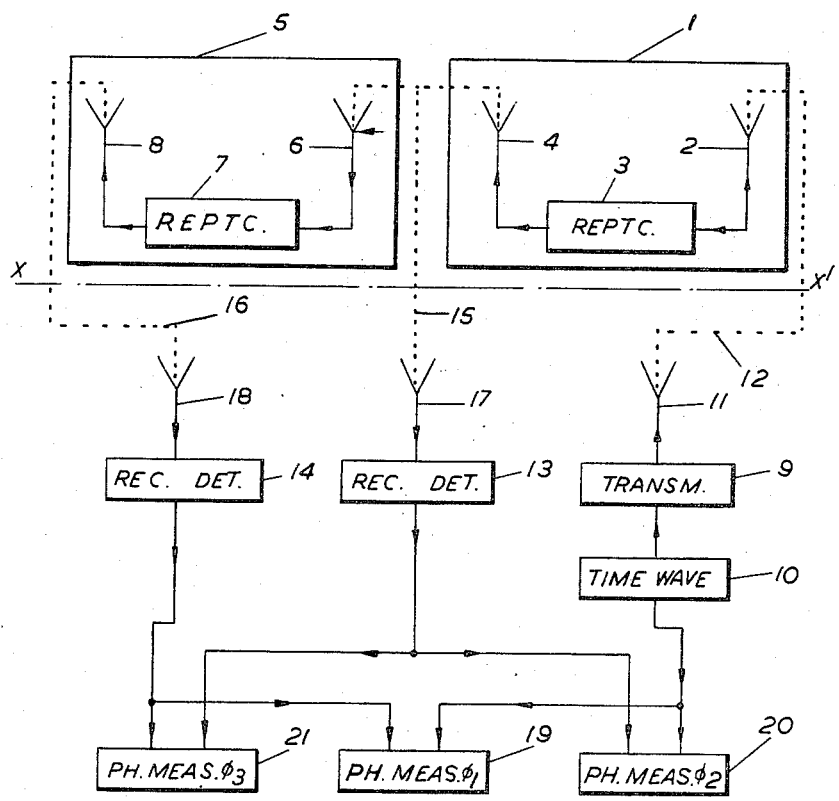
Fig. 1 illustrates in block form the ground and air equipment comprised in an embodiment of the invention.

Referring to Fig. 1, this shows in block form the various units constituting an embodiment of the system, those units shown above the dash-dot line XX' being located on the ground, and those shown below the dash-dot line XX being located on an aircraft which is to be navigated in accordance with the guiding indications supplied by the system.

As shown on the drawing, the ground equipment comprises a first radio repeater station, reference 1, with receiving antenna 2, repeating unit 3 and transmitting antenna 4, and a second radio repeater station reference 5 with receiving antenna 6, repeating unit 7, and transmitting antenna 8. In the present embodiment these repeater stations are spaced apart by 18 km. and located with respect to the entrance to an airport approach zone as described hereinafter. The antennae 2, 4 and 8 are directly included in respective radio channels linking the ground and air portions of the system, and are therefore made of omnidirectional type. Antenna 6 is used only for receiving energy radiated by repeater station 4 and is therefore preferably (but not necessarily) made directive as indicated in the drawing, with the axis of maximum receptivity in line with repeater 1. Both repeater stations are of the frequency-changing type i. e. the signal to be repeated is received on one carrier frequency but repeated (re-radiated) on another carrier frequency, the carrier frequencies transmitted by the two repeater stations being different from each other and from that received by the first repeater station.

The aircraft equipment, shown below the line XX in Fig. 1, comprises a radio transmitter 9 modulated by timing wave energy supplied by source 10. In the present instance this timing wave is a continuous wave of frequency 4.167 kc./s. The modulated energy supplied by transmitter 9 is radiated by omnidirectional antenna 11 for interception by the receiving antenna 2 of radio repeater station 1 as indicated by the dotted line 12. The aircraft equipment further comprises two receiver-detectors 13 and 14. Receiver-detector 13 is arranged to selectively receive and detect modulated energy radiated from the output antenna 4 of repeater station 1, as indicated by dotted line 15, while receiver-detector 14 is arranged to selectively receive and detect modulated energy radiated from the output antenna 8 of repeater station 5, as indicated by dotted line 16. For the sake of clarity in the diagram, the receiver-detectors 13 and 14 are shown as energised through separate omnidirectional receiving antennae 17 and 18, but it is to be understood that such use of two separate antennae is not essential to the invention, and that both the receiver-detectors 13 and 14 may be energised in common from a single antenna if desired.

The detected outputs from receiver-detectors 13 and 14 are constituted by respective recovered timing waves of the same frequency as the original timing wave generated in 10, but of different phase determined in each case by the total path length traversed by the signal in its journey from transmitter 9 to the receiver-detector via the ground equipment already described. Phase measuring units 19, 20 and 21 are included in the aircraft equipment for the purpose of measuring the phase relations between the two outputs and between each output wave and the timing wave supplied by source 10. As indicated on the drawing, phase measuring unit 19 measures the phase difference $\varphi_1$, between the original timing wave from source 10 and the recovered timing wave from receiver-detector 14 i. e. between the timing wave transmitted and that recovered after passing through repeater stations 1 and 5 and receiver-detector 14. Phase measuring unit 20 measures the phase difference $\varphi_2$ between the original timing wave and that recovered after passing through repeater 1 and receiver-detector 13. Phase measuring unit 21 measures the phase difference $\varphi_3$ between the two timing waves recovered via the two receiver-detectors 13 and 14.

The phase measuring units 19, 20 and 21 may be of any convenient type capable of covering the range of phase angle required to be measured. In the most general case use may be made of known phase measuring arrangements which are capable of displaying any phase difference between 0° and 360°. In the present instance, as explained hereinafter, the phase angles to be measured all centre on 90° or an odd multiple thereof, and each phase measuring unit may therefore conveniently comprise a known simple phase discriminator arrangement with a centre-zero meter the needle of which deflects to one side or the other according as the phase difference to be measured is greater or less than the central (90°) value.

For an explanation as to how the system is operated, reference should now be made to Fig. 2, which illustrates in plan the positions of the repeater stations relative to the airport approach zone, and some of the guide paths which may be followed by the aircraft. In this figure, the airport (not shown) is considered to lie to the right of the drawing, with the longitudinal axis of the approach zone along the direction indicated by the arrow heads on horizontal line 22, the converging edges of the zone being indicated by the dash-lines 23 and 24 and the "gate" or entrance to the zone being indicated by the rectangle 25. It is assumed that the landing approach to the airport is made under the G. C. A. or I. L. S. systems already mentioned, and that the entrance or "gate" indicated by rectangle 25 is at an altitude of say 2,000 ft., has a width of about 6 km. between the ends of the edge-lines 23 and 24, and is distant from the airport runway by about 10 km. The repeater stations 1 and 5 are shown as equally spaced on either side of the approach zone axis by a distance 9 km. The line joining the two repeater stations is spaced from the gate 25 by approximately the same distance, but this spacing from gate 25 is not critical.

As already mentioned, the aircraft equipment includes means for measuring the phase difference $\varphi_1$, between the transmitted timing wave and that recovered at the output of receiver-detector 14 (Fig. 1). This phase difference (ignoring phase shifts in the various apparatus units) is proportional to the sum of the path-lengths between the aircraft and repeater station 1, between repeater station 1 and repeater station 5, and between repeater station 5 and the aircraft. If this summation length is maintained constant i. e. if the aircraft is navigated so that $\varphi_1$ is maintained constant, then the path of the aircraft is confined to one of a family of ellipses the two foci of which are located each at a respective one of the repeater stations 1 and 5. In Fig. 2 three such ellipses are shown at 26, 27 and 28, corresponding respectively to $\varphi_1=260°$, to $\varphi_1=270°$, and $\varphi_1=280°$, for a timing wave frequency of 4.167 kc./s.

The aircraft equipment further includes means for measuring the phase difference $\varphi_2$ between the transmitted timing wave and that recovered at the output of receiver-detector 13 (Fig. 1). This phase difference is proportional to the sum of the path lengths between the aircraft and repeater station 1, and the return path between repeater station 1 and the aircraft. If this summation length is maintained constant i. e. if the aircraft is navigated so that $\varphi_2$, is maintained constant, then the path of the aircraft is confined to one of a family of circles the centre of which is located at repeater station 1. In Fig. 2, three such circles are shown at 29, 30 and 31, corresponding respectively to $\varphi_2=80°$, to $\varphi_2=90°$, and to $\varphi_2=100°$ for a timing wave frequency of 4.167 kc./s.

The aircraft equipment also includes means for measuring the phase difference $\varphi_3$, between the timing waves recovered at the outputs of receiver-detectors 13 and 14 (Fig. 1) respectively. This phase difference is proportional to the difference between the path length from the aircraft to repeater station 1, and the sum of the path lengths from repeater station 1 to repeater station 5 and from repeater station 5 to the aircraft. If this difference in path length is maintained constant, i. e. if the aircraft is navigated so that $\varphi_3$ is maintained constant, then the path of the aircraft is, as is well known, confined to one of a family of hyperbolae. In Fig. 2, parts three such hyperbolae are shown at 32, 33 and 34, corresponding respectively to $\varphi_3=80°$, to $\varphi_3=90°$, and $\varphi_3=100°$, for the timing wave frequency of 4.167 kc./s. The hyperbola shown at 33 passes through the midpoint between the repeater stations, and defines a straight line path coincident with the longitudinal axis of the approach zone.

As indicated on Fig. 2, each of the elliptical paths is, at one point therealong, tangential to a corresponding one of the circular paths, this one point lying on an extension of the line joining the repeater stations 1 and 5, and at this one point it is possible to make a smooth transition from the elliptical path to the tangential circular path. Further, each of the circular paths is tangential to a corresponding hyperbolic path at a point which lies on the line joining the repeater stations 1 and 5, and at this point a smooth transition can be made from the circular to the hyperbolic path. The preferred hyperbolic path is, of course, the straight line path 33 which bisects perpendicularly the line joining the repeater stations 1 and 5, and since these stations are equally spaced on either side of the longitudinal axis of the approach zone, this preferred path will lead an aircraft to the centre of the approach zone "gate" 25. Corresponding to this preferred hyperbolic path 33, is the preferred circle path 30, i. e. that circle path which is tangential to the preferred hyperbolic path. The radius of this circle is determined primarily with reference to a convenient rate of turn for the aircraft to be guided. In the present instance it has been assumed that a radius of 9 km. is satisfactory from the point of view of rate of turn on a descent for a fast craft. This fixes the position of repeater station 1 at a distance of 9 km. to one side of the longitudinal axis of the approach zone, repeater station 5 being then positioned at the same distance of 9 km. to the other side of the longitudinal axis, so as to bring the "straight" hyperbolic path 33 in line with the approach zone axis, and the fixing of the repeater station positions automatically determines the shape of the elliptical path being that indicated by reference 27, i. e. that the ellipse which is tangential to the preferred circle path 30.

It will be evident from the foregoing that in selecting the radius of the preferred circle path 30, this selection being governed primarily by flight considerations, and in fixing the position of the preferred hyperbolic path the straight line path 30 so that it heads into the approach zone gate along the axis of the zone, the positions of all the preferred paths have been fixed, irrespective of the value of the timing wave frequency. If the timing wave frequency is changed the preferred paths remain unchanged, but the phase values characteristic of the paths are altered. It will be observed that, for the preferred ellipse 27, the path length on which the value of $\varphi_1$ depends is six times the radius of the preferred circle i. e. 54 km.; for the preferred circle 30 the path length on which the value of $\varphi_2$ depends is twice the radius of the circle i. e. 18 km.; and for the preferred hyperbolic path 33 the path difference on which the value of $\varphi_3$ depends is twice the radius of the circle i. e. 18 km., so that for the preferred paths we have the relationships $$\varphi_1 = 3\varphi_2$$

$$\varphi_3 = \varphi_2$$

By choosing a timing wave of frequency 4.167 kc./s., wavelength 72 km., i. e. eight times the spacing of the repeater stations from the axis, for the preferred paths we have $\varphi_2 = \varphi_3 = 90°$, and $\varphi_1 = 3\varphi_2 = 270°$. These values are specially convenient, since they render possible the use of simple phase discriminators for the phase measuring units 19, 20 and 21, as already mentioned.

In actual use an aircraft arriving at some point such as 35 (at which $\varphi_3 = 360°$) would be steered into the preferred elliptical path at a point such as 36, the "on path" indication being given by the phase measuring unit 19, displaying the correct value of $\varphi_1 = 270°$. The pilot would then navigate so as to maintain $\varphi_1$ constant at 270°, thus travelling round ellipse 27, and at the same time watch the phase measuring unit 20, the reading on which would gradually change until it indicated $\varphi_2 = 90°$, at which instant the pilot would know that he was at the point 37, i. e. at the point of tangency between the elliptical and the circular preferred paths. He would then cease to attend to the $\varphi_1$ indication, and navigate so as to maintain $\varphi_2$ constant at 90°, thus travelling round circle 30, and at the same time watch the phase measuring unit 21, the reading on which would gradually change until it indicated $\varphi_3 = 90°$, at which instant the pilot would know that he had reached the point 38, i. e. the point of tangency between the circular and the hyperbolic preferred paths. Thereafter, he would cease to attend to the $\varphi_2$ indication, and navigate so as to maintain $\varphi_3$ constant at 90°, thereby following the straight path 33 into the centre 39 of the approach zone gate 25. It will be understood of course that from the moment of leaving point 35 the craft is navigated so as to change height at a rate sufficient to ensure that the gate 25 is approached at the correct altitude, in the present case assumed to be 2,000 ft.

For a timing wave frequency of 4.167 kc./s., one degree of phase difference is equivalent to a path length of 200 metres. If we assume that the accuracy of the phase measurement units 19, 20 and 21 is limited near the on course values to within say ±2.5°, then the width of the course defined by the system just described would be of the order of 1 km. This has to be considered in relation to the width of the gate 25, which in the present instance is about 6 km.

Using phase discriminators operating left-right indicating meters as already mentioned, it is practicable to display phase readings over a range of plus and minus 10° about the on-course position, giving zones of operation bounded as shown on Fig. 2 by the pairs of course lines 26 and 28 for the elliptical path, and 32, 34 for the circular path, and 32, 34 for the hyperbolic path. It will be observed that even with this relatively large phase tolerance the craft is always guided into the gate of the approach zone.

It is evident that ambiguities exist, but the separation between ambiguous courses is sufficient to justify the assumption that the initial approach could be made with sufficient accuracy to avoid confusion.

It will also be apparent that elliptical paths at different heights could serve as holding patterns to be followed by waiting aircraft.

Figure 3:
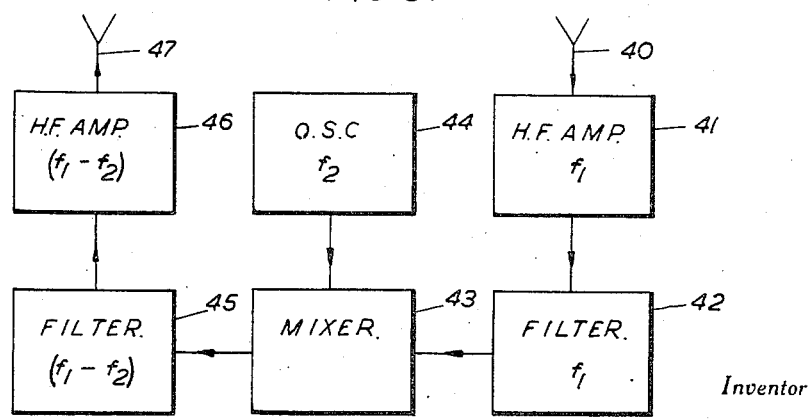
Fig. 3 illustrates a preferred form of repeater station for use in the embodiment illustrated in Fig. 1.

While the repeater stations 1 and 5 (Fig. 1) may be of any type appropriate to their functions as hereinbefore explained, it is preferred that they be of the non-demodulating type, i. e. of a type in which at no point in the repeater system does the timing wave signal exist other than in the form of a modulated carrier. A suitable repeater station arrangement is illustrated in Fig. 3. In this arrangement the signal to be repeated is picked up by antenna 40 as a modulated carrier wave of carrier frequency $f_1$. The output of antenna 40 is amplified in high frequency amplifier 41, and then applied through a filter 42 to mixer 43. Filter 42 is constructed to pass only the carrier frequency $f_1$ and the timing wave modulation sidebands thereof. Mixer 43 also receives input from oscillation 44 of frequency $f_2$. The mixer output is applied to another bandpass filter 45, which is constructed to pass only those mixer products which correspond to beats between the two mixer inputs i. e. to pass only a carrier wave of frequency $(f_1 - f_2)$, together with the frequency-shifted timing wave modulation sidebands. The output from filter 45 is then amplified in high frequency amplifier 46 and radiated from antenna 47. This arrangement has the advantage that the repeaters do not radiate except when interrogated, whereby the incidence of interference between airports using the same frequencies is reduced. It will be understood that in the arrangement of Fig. 3, the amplifying and filtering functions at each carrier frequency may, if desired, be performed in a combined unit instead of in separate units.

While the principles of the invention have been described above in connection with specific embodiments, and particular modifications thereof, it is to be clearly understood that this description is made only by way of example and not as a limitation on the scope of the invention.

What I claim is:

1. A radio navigation system for guiding an aircraft along an approximately spiral course successive parts of which are respectively defined by elliptical, circular, and hyperbolic arcs, said system comprising a first radio repeater ground station arranged to repeat timing wave signals transmitted by said aircraft, a second radio repeater ground station spaced from and arranged to repeat the timing wave signal output from said first station, and on said aircraft means for separately receiving the outputs from said two stations and for recovering therefrom the repeated timing wave signals, with means responsive to the timing of said transmitted and said recovered timing wave signals for obtaining indications of the position of said aircraft relative to respective ones of said arcs.

2. A radio navigation system for enabling an aircraft to be steered into the entrance to an airport approach zone over an approximately spiral guide course including in sequence an elliptical, a circular and a hyperbolic path component, said system comprising on the ground first and second spaced radio repeater stations located in predetermined positions relative to said entrance and adapted to repeat in cascade the signals received by said first repeater station from said aircraft, said system further comprising on said aircraft a timing wave generator, means for transmitting the generated timing wave to said first repeater station, means for separately receiving the outputs of both said repeater stations, means for recovering the repeated timing waves from said received outputs, and means for measuring the time displacements between all of said generated and said recovered timing waves taken in pairs to obtain respective indications of the position of the aircraft in relation to predetermined elliptical, circular and hyperbolic paths.

3. A radio navigation system for enabling an aircraft to be steered over an approximately spiral guide course into the entrance "gate" of an airport approach zone which zone has a longitudinal landing axis, said course including in sequence an elliptical, a circular and a hyperbolic path component, said system comprising first and second radio repeater ground stations spaced transversely on either side of said axis by a predetermined distance therefrom and spaced from said gate in the direction remote from said zone, said first station being arranged to repeat signals received from said aircraft and said second station being arranged to repeat signals received from said first station, said system further comprising on said aircraft a timing wave generator, means for transmitting the generated timing wave to said first repeater station, means for separately receiving the outputs of both said repeater stations, means for recovering from said received outputs the repeated timing waves, means for measuring the time displacement between said generated timing wave and the timing wave recovered from the output of said second repeater station to obtain an indication representative of a predetermined elliptical path, means for measuring the time displacement between said generated timing wave and the timing wave recovered from the output of said first repeater station to obtain an indication representative of a predetermined circular path, and means for measuring the time displacement between said two recovered timing waves to obtain an indication representative of a predetermined hyperbolic path.

4. A system according to claim 3, in which said predetermined distance is made equal to the radius of curvature of said circular component of the course.

5. A system according to claim 4, in which said timing wave is a continuous wave, and each said means for measuring time displacement comprises phase measuring means.

6. A system according to claim 5, in which the wavelength of said timing wave is made substantially equal to eight times said predetermined distance.

7. A system according to claim 6, in which each said repeater station is arranged to radiate only when receiving input signals.

References Cited in the file of this patent

UNITED STATES PATENTS

| | | |
|---|---|---|
| 1,750,668 | Green | Mar. 18, 1930 |
| 2,198,113 | Holmes | Apr. 23, 1940 |
| 2,248,727 | Strobel | July 8, 1941 |
| 2,528,141 | Hastings | Oct. 31, 1950 |